Patented Mar. 17, 1936

2,033,954

UNITED STATES PATENT OFFICE 2,033,954

PAPER MANUFACTURE

Harold Robert Rafton, Andover, Mass., assignor to Raffold Process Corporation, a corporation of Massachusetts No Drawing. Application January 26, 1932, Serial No. 589,043

6 Claims. (Cl. 91—68)

My invention relates to the manufacture of paper.

The principal object of my invention is the manufacture of an improved quality of paper filled with calcium carbonate magnesium basic carbonate.

An important object is the manufacture of an improved quality of paper coated with calcium carbonate magnesium basic carbonate.

A further object of my invention is the manufacture of filled paper of a higher opacity and better finish than paper previously made with calcium carbonate magnesium basic carbonate as a filler.

A further object of my invention is the manufacture of coated paper of a higher opacity and better finish than paper previously made with calcium carbonate magnesium basic carbonate as a coating pigment.

Other objects and advantages of my invention will become apparent during the course of the following description.

The present invention is an improvement on that covered by my prior Patent No. 1,595,416, issued August 10, 1926, which discloses paper filled with, and also paper coated with, calcium carbonate magnesium basic carbonate.

My prior patent contemplates papers filled and/or coated with several specifically different forms of calcium carbonate magnesium basic carbonate which are prepared according to various modifications of the treatment of a lime containing magnesia with carbon dioxide. One modification of the material, which I may term Modification A, may be produced by reacting in the cold under pressure completely slaked dolomitic lime, i. e. a lime containing approximately equimolecular proportions of calcium and magnesium, with carbon dioxide up to the point where the calcium begins to dissolve as bicarbonate, about two-thirds of the magnesium being dissolved before the calcium begins to go into solution. The undissolved material is calcium carbonate magnesium basic carbonate, containing less magnesium in proportion to the calcium than in the lime used as starting material. By recovering the dissolved magnesium from the accompanying liquid and mixing the recovered magnesium compound with the undissolved matter, or by effecting the recovery in the presence of the latter, a somewhat different product (Modification B), containing the original undissolved material mixed with magnesium material precipitated from its solution, is obtained. If the addition of carbon dioxide is continued after the calcium begins to be dissolved, and the entire calcium and magnesium is recovered from the solution, or in addition to any which may remain undissolved, by removal of the carbon dioxide which is holding them in solution, a different modification of the product (Modification C), is obtained.

If Modification A be made from lime in moderately dilute aqueous suspension, say about 5 per cent., there may be produced a material (Modification A1), which is finely divided, and substantially all of whose particles appear to be of fine point-like shape under the microscope. Under other conditions, as when the lime suspension is considerably more concentrated, there may also be seen under the microscope, in addition to the point-like particles, a certain amount of crystalline material either long or needle-like, or of somewhat feathery shape, which is probably a compound of magnesium precipitated from solution. These crystals are, of course, very finely divided from the standpoint of examination by microscopic means and also when viewed under the microscope, but when viewed under the higher powers they are readily distinguished from the point-like particles. This material may be termed Modification A2.

Modifications B and C, when viewed under the microscope, are somewhat like Modification A2, with the exception however that Modifications B and C have a great deal more of the needle-shape or feathery crystals present. Moreover, it is to be noted that Modifications B and C contain substantially the same proportion of calcium to magnesium as did the lime from which they were made.

Of the various calcium carbonate magnesium basic carbonates referred to above, only Modification A1 possesses the point-like microscopic structure, and this structure is obtained only when the product contains less magnesium in proportion to the calcium than is contained in the original lime. As, in the above example of preparing Modification A1, approximately two-thirds of the original lime used has been dissolved out, the calcium and magnesium radicals are thus present in Modification A1 in the molecular proportions of substantially three to one.

The paper forming the subject matter of the present invention contains a new type of calcium carbonate magnesium basic carbonate, and is materially different from and a substantial improvement over the paper covered by my prior patent referred to above. This new type of calcium carbonate magnesium basic carbonate is produced in novel manner substantially different from the procedures described in my Patent No. 1,595,416. In this connection, cross reference is made to my copending applications Serial Numbers 589,044, 589,045, and 589,046, all filed on January 26, 1932. These applications relate to the broad development in the art to which the present application pertains but the claims therein are directed only to the novel processes and pigments disclosed, whereas the present application is directed to the novel papers constituting a part of this new development.

As set forth in the foregoing copending applications, I have found that by conducting the manufacture of calcium carbonate magnesium basic carbonate in a somewhat different manner from either of the illustrative procedures referred to, I can produce a calcium carbonate magnesium basic carbonate which, although it contains substantially the same proportion of magnesium to calcium as obtains in the lime containing magnesia originally employed, nevertheless contains substantially no needle or feathery shaped crystals, substantially all of the particles being of point-like shape.

I have found that this material differs in microscopic structure from the calcium carbonate magnesium basic carbonate made, as disclosed in my cited prior patent, from a solution of calcium and magnesium salts and soluble carbonates or carbonates and hydroxides, as the particles of the former material although microscopically minute, either do not have the point-like structure of my new modification, or possess needle-like crystals, or both.

The microscopic appearance of this material is not essentially different from the microscopic appearance of Modification A1 but nevertheless the material has characteristics of increased opacity and the capability of taking a higher finish distinct from this former material, and imparts distinct technical differences to the papers manufactured therewith. This may be due to the somewhat different basic compound which may comprise the basic magnesium carbonate which is formed by my new method and probably also to the proportionately greater magnesium compound content of my new material.

The new material differs markedly, however, in microscopic appearance from Modification A2 and particularly from Modifications B and C, as well as from the modifications produced from the precipitation of soluble salts (as indicated above), and gives distinct technical differences to the papers manufactured therewith, notably a higher opacity and an improved finish.

In my copending applications listed above, I describe several modifications of the process of producing this new material. However, it will suffice for illustrative purposes herein merely to set forth a preferred method of producing the product. I preferably thoroughly slake dolomitic lime with water which is boiling or nearly boiling, the water being in an amount which will result in a final slaked mass of the character of a thick mud. I prefer to agitate the mass during slaking and continue the agitation for some time after the slaking action has apparently ceased. Ordinarily two to three hours is a sufficient time in which to complete the slaking action. The slaked lime is then diluted with water to a consistency which may conveniently be in the neighborhood of 1 to 2 lbs. dry solids to the gallon. The resulting suspension is then preferably raised to a temperature above 60° C., and preferably not below approximately 80° C., and better as near 100° C. as feasible. The heated suspension is then subjected to carbon dioxide gas, preferably until no further carbon dioxide is absorbed. The rate of absorption of the gas is high at first as no doubt the calcium reacts with the carbon dioxide until it is substantially all satisfied, i. e. converted to calcium carbonate, before the magnesium is substantially acted upon. The magnesium then begins to be acted upon and the reaction proceeds to completion, i. e. until substantially all of the magnesium content is converted to magnesium basic carbonate of a definite composition as explained below, after which substantially no further carbon dioxide is absorbed. While the time required for the reaction is subject to considerable variation, I have found that the reaction may ordinarily be completed in from 8 to 24 hours. The finished wet material after carbonation is preferably treated to eliminate or separate oversize particles. I prefer screening followed by ultra screening for this purpose. This produces a material of high quality possessing a very small quantity, if any, of particles greater than .001″ in diameter. The material obtained from the ultra screening operation may be used directly, or it may be washed or otherwise treated, and de-watered and/or dried if desired by the use of known apparatus.

If it be desired to further reduce the particle size or colloidize the material, such result can be accomplished by known means such as ball mills, rod mills, or other suitable mills.

It will be apparent that if, in the carbonation procedure herein described, impure carbon dioxide gas be employed, such for example as carbon dioxide containing sulphur dioxide, this will result in introducing a certain amount of impurity into the final reaction product. Ordinarily if the amount of impurity be small, it has little effect from a practical standpoint on the quality of the material produced; but it may be readily avoided if desired, for example, by suitably purifying the gas used, as set out previously above.

The final carbonated material, for example in the case where dolomitic lime has been used, has a substantially definite composition and one which I have found is reproduceable even with dolomitic lime derived from two entirely different sources, such for instance as with dolomitic lime derived from the Niagara formation of northern Ohio and with dolomitic lime derived from the western Massachusetts dolomitic lime formation. Such dolomitic limes after treatment to saturation with carbon dioxide as herein described yield products which have a residue on ignition which equals approximately 50 to 51% of the original dry weight of the material.

The new form of calcium carbonate magnesium basic carbonate prepared in the manner described above, or by any of the several modifications of my general method described in my copending applications Serial Numbers 589,044, 589,045 and 589,046, is particularly adapted for use in the manufacture of paper, either as a filler in the manufacture of filled paper, or as a coating pigment in the manufacture of coated paper.

Of course, as will be understood, if I carry the reaction far enough to completely carbonate the calcium but not to completion as far as the conversion of all the magnesium content of the lime into magnesium basic carbonate is concerned, I obtain as the reaction product a mixture of calcium carbonate magnesium hydroxide, and calcium carbonate magnesium basic carbonate. This material will have the same general appearance under the microscope as the completely carbonated material, and acts technically in paper similarly to a mixture of calcium carbonate magnesium hydroxide and calcium carbonate magnesium basic carbonate. It is to be understood that in any such mixture there is present in part at least the final material which I would produce had the reaction gone to completion, and the use in paper of such partially completed reaction product therefore falls within the scope of my invention.

As I have described my process above, I preferably start with a lime containing magnesia. Instead of using lime as the starting material I may use, in a similar aqueous suspension, the pigment calcium carbonate magnesium hydroxide, such for example as is produced in conjunction with sodium hydroxide, i. e. an alkali metal hydroxide, from lime containing magnesia and sodium carbonate, i. e. an alkali metal carbonate, by the process described in my prior Patent No. 1,415,391, of May 9, 1922. This material when made from dolomitic lime has a residue on ignition of approximately 61 to 62%. It is converted by my present process into a calcium carbonate magnesium basic carbonate having substantially the same crystalline structure and substantially the same residue on ignition, namely approximately 50 to 51%, as has the material produced when dolomitic lime itself is used as the starting material.

In the manufacture of one modification of my paper, namely filled paper, I may mix the fibrous constituent or constituents with my material suitably in a beating engine, subject the same to the usual mechanical treatment therein and if desired to subsequent treatment in a refining engine such for example as a Jordan, then after suitable dilution pass the mix on to a web-forming device, dry the web, and finish it in the customary manner.

I may use any amount of my material in proportion to the fibre as desired, but inasmuch as my material is particularly well fitted for use in highly filled sheets, I prefer to use an amount which will give a filler content in the resulting sheet of approximately 25-30%. If suitable white water recovery systems are employed, the actual proportion of filler to fibre furnished in the beater need not be much greater than that in the final paper, as substantially all the filler is recovered under such conditions, but if such systems are not employed, it is of course necessary to use sufficient extra filler to make up for the losses in the white waters.

In the manufacture of either substantially unsized or sized paper containing my filler, there may be employed if desired any or all of the processes disclosed in my numerous issued patents or copending applications on the use of alkaline fillers in paper-making, particularly those having to do with the addition of materials to the paper mix under conditions favoring the minimizing of the time and/or intimacy of contact of the constituents of the mix, or with the application of material to the paper web itself, and cross reference is hereby made to said patents and applications, a number of which are specifically mentioned below.

If it be desired to make unsized paper with my filler, no other material but the fibrous material and the filler need be employed, but usually it is highly desirable also to employ acidic material such as alum preferably at the dilute stage as disclosed in my U. S. Patent No. 1,803,646, issued May 5, 1931. Moreover it is at times very desirable to employ starch, cross reference being made in this connection to my U. S. Patent No. 1,831,928, issued November 17, 1931. Furthermore the filler need not be added in the beater, but it may—and this is the procedure which is usually preferable—be added later on in the process e. g. at the dilute stage of the papermaking operation, in accordance with the procedure disclosed in my U. S. Patent No. 1,808,070, issued June 2, 1931.

If sized paper is to be made, suitable sizing agents such as rosin, paraffin or the like, suitably applied, may be employed for imparting water resistance to the sheet. Such suitable sizes and methods are disclosed in numerous of my issued patents and copending applications, for example, Patents Nos. 1,803,643, 1,803,645, 1,803,647, 1,803,648, 1,803,650, 1,803,651, and 1,803,652, all issued May 5, 1931; and applications Serial No. 501,674, filed December 11, 1930, and Serial No. 534,461, filed May 1, 1931.

The filled paper produced with my filler is distinctly superior in quality to that produced with calcium carbonate magnesium basic carbonate produced by the carbonation of lime containing magnesia according to the process described in my prior Patent No. 1,595,416. It is more opaque, more uniform, has better printing qualities, possesses a better finish, and is more easily finished on the calenders. This as will be apparent represents a substantial advance in the art.

In the manufacture of another modification of my paper, namely coated paper, I may mix with my material an adhesive or mixture of adhesives, and apply the same to the surface or surfaces of a paper "body stock" by the use of any suitable paper coating machine. Any of the customary adhesives, such as starch, casein or the like may be used. As will be understood, other organic materials and/or inorganic materials, such as may be used in the manufacture of coated paper may be additionally incorporated in the mix if desired prior to the application of the mix to the body stock. The coated paper may then be dried and finished as usual.

I have found that my material, when produced from dolomitic lime, yields a filter press cake of approximately 37 to 40% solid content, according to the vacuum or pressure employed on the filter press used. Furthermore I have found that the material appears to require a definitely larger percentage of adhesive for the production of a coating of satisfactory strength than does my former calcium carbonate magnesium basic carbonate, requiring in certain cases, with casein for example, in the neighborhood of 35% air dry casein based on the weight of dry pigment. It will be apparent that when using a pigment which is not dewatered to any greater extent than the above for coating the ordinary grades of book and magazine coated papers which require a fairly heavy coating, due care should be taken, if the adhesive be dissolved prior to admixture with the pigment, that the adhesive be made up as a fairly concentrated solution, so as to produce a final mix of suitable concentration. For example, 1 part of casein in 4 parts by weight total casein solution will be a satisfactory concentration of adhesive to employ.

I have found when my pigment is the only pigment employed in a coating mix with an adhesive such as casein, that the mix has a tendency in certain cases to be somewhat difficult to spread and to brush mark when it is used on a brush coating machine.

I have found, however, that by the use of the process disclosed in my copending application Serial No. 428,231, filed February 13, 1930, namely, the addition of a small amount of acidic material such as alum to the material prior to blending it with the casein solution, that I have been able to reduce the viscosity of the resulting mix and substantially overcome the tendency to spread poorly and brush mark. Approximately one percent of alum based on the dry weight of the pigment is usually a satisfactory amount to employ.

When my pigment is used alone as the only pigment in a coating, it imparts an excellent degree of finish to the sheet. In certain cases this does not seem to be so high a finish as is imparted by satin white, but it is substantially higher than the finish imparted by the calcium carbonate magnesium basic carbonate made by carbonating dolomitic lime according to the process outlined in my above mentioned Patent No. 1,595,416, and also higher than the finish imparted by the use of the pigment calcium carbonate magnesium hydroxide disclosed in my Patent No. 1,415,391.

I have found that my pigment may be used as the only pigment in a coating mix, or that it may be employed in connection with other pigments ordinarily used in coating, such for example as clay, satin white, blanc fixe, calcium carbonate magnesium hydroxide or the like. It may be employed with any of the customary adhesives such as casein, modified starches and the like. Also the usual other ingredients of a mix such as coloring matter, antifroth oils and the like may be employed.

I have found that when my pigment is used in a coating mix with other pigment such as clay, any tendency toward brush marking is greatly minimized if not substantially eliminated. I have also found that in certain instances under such conditions there seems to be a reduction in the adhesive requirements of my pigment, so that it thus becomes desirable in certain cases to employ my material in conjunction with other pigment in the coating mix, apart from any consideration of the additive qualities which the several pigments may impart to such mix.

I have found that the paper coated with my material has not only, as stated above, a substantially higher finish than paper coated with the calcium carbonate magnesium basic carbonate produced as described in my Patent No. 1,595,416, but that the coated paper appears whiter in color than the paper coated with my former material, finishes more easily, has better printing qualities, and is more opaque. These improved characteristics, as will be well understood, are very desirable in a coated paper, and represent a distinct improvement in quality over the paper formerly produced.

It is of course possible to employ paper filled with my material as the body stock for paper coated with my material; but it is to be understood that paper filled with my material may if desired be coated with other material; whereas any suitable paper other than that filled with my material may if desired be employed as body stock to which to apply my coating material.

When I use the word "paper" herein, I use it in the broad sense to include products of manufacture of all types and of all weights and thicknesses, which contain as an essential constituent a considerable amount of prepared fibre and which are capable of being produced on a Fourdrinier, cylinder, or other forming, felting, shaping or molding machine.

The words "coated paper" in this specification are to be understood as referring to the coated product produced by coating any type of paper coming under the definition of "paper" given above.

Where I use the term "alkaline earth metal", I intend it to include magnesium.

While I have described in detail the preferred embodiments of my invention, it is to be understood that the details of procedure, the proportions of ingredients, and the arrangement of steps may be widely varied without departing from the spirit of my invention or the scope of the subjoined claims.

I claim:

1. A filled paper whose ingredients include fibrous material and a filler comprising calcium carbonate magnesium basic carbonate, the particles of which filler are substantially all of very fine point-like shape, and in which filler the calcium and magnesium radicles are present in substantially equimolecular proportions.

2. A filled paper whose ingredients include fibrous material and a filler comprising calcium carbonate magnesium basic carbonate, the particles of which filler are substantially all of very fine point-like shape, the residue on ignition of said filler being substantially fifty to fifty-one percent.

3. A coated paper comprising a paper body stock and a coating whose ingredients include an adhesive and a pigment comprising calcium carbonate magnesium basic carbonate, the particles of which pigment are substantially all of very fine point-like shape, and in which pigment the calcium and magnesium radicles are present in substantially equimolecular proportions.

4. A coated paper comprising a paper body stock and a coating whose ingredients include an adhesive and a pigment comprising calcium carbonate magnesium basic carbonate, the particles of which pigment are substantially all of very fine point-like shape, the residue on ignition of said pigment being substantially fifty to fifty-one percent.

5. A filled and coated paper which comprises fibrous material and a filler comprising calcium carbonate magnesium basic carbonate, the particles of which filler are substantially all of very fine point-like shape, and in which filler the calcium and magnesium radicles are present in substantially equimolecular proportions, and a coating whose ingredients include an adhesive and a pigment comprising calcium carbonate magnesium basic carbonate, the particles of which pigment are substantially all of very fine point-like shape, and in which pigment the calcium and magnesium radicles are present in substantially equimolecular proportions.

6. A filled and coated paper which comprise fibrous material and a filler comprising calcium carbonate magnesium basic carbonate, the particles of which filler are substantially all of very fine point-like shape, the residue on ignition of said filler being substantially fifty to fifty-one per cent., and a coating whose ingredients include an adhesive and a pigment comprising calcium carbonate magnesium basic carbonate, the particles of which pigment are substantially all of very fine point-like shape, the residue on ignition of said pigment being substantially fifty to fifty-one per cent.

HAROLD ROBERT RAFTON.

CERTIFICATE OF CORRECTION.

Patent No. 2,033,954.

March 17, 1936.

HAROLD ROBERT RAFTON.

It is hereby certified that error appears in the printed specification of the above numbered patent requiring correction as follows: Page 1, second column, line 22, for the word "microscopic" read macroscopic; and that the said Letters Patent should be read with this correction therein that the same may conform to the record of the case in the Patent Office.

Signed and sealed this 25th day of August, A. D. 1936.

Leslie Frazer (Seal)

Acting Commissioner of Patents.